(12) United States Patent
Dake (10) Patent No.: US 8,156,491 B2
(45) Date of Patent: Apr. 10, 2012

(54) FAULT TOLERANT VIRTUAL MACHINE

(75) Inventor: Steven Dake, Flagstaff, AZ (US)

(73) Assignee: Red Hat, Inc., Raleigh, NC (US)

( * ) Notice: Subject to any disclaimer, the term of this patent is extended or adjusted under 35 U.S.C. 154(b) by 1077 days.

(21) Appl. No.: 12/074,175

(22) Filed: Feb. 29, 2008

(65) Prior Publication Data

US 2009/0222815 A1 Sep. 3, 2009

(51) Int. Cl.
*G06F 9/455* (2006.01)
*G06F 11/00* (2006.01)

(52) U.S. Cl. ............................ 718/1; 714/4.11; 370/221

(58) Field of Classification Search ...... 718/1; 714/4.11; 370/221

See application file for complete search history.

(56) References Cited

U.S. PATENT DOCUMENTS

| | | | |
|---|---|---|---|
| 4,575,842 A * | 3/1986 | Katz et al. | 370/221 |
| 7,185,236 B1 * | 2/2007 | Moser et al. | 714/47.2 |
| 2004/0172574 A1* | 9/2004 | Wing et al. | 714/4 |

OTHER PUBLICATIONS

Amir, Y., et al., "The Totem Single-Ring Ordering and Membership Protocol", 29 pages, first published Dec. 1991, IEEE International Conference on Informational Engineering, Singapore.

* cited by examiner

*Primary Examiner* — Thomas Lee
*Assistant Examiner* — Terrell Johnson
(74) *Attorney, Agent, or Firm* — Lowenstein Sandler PC (57) ABSTRACT

A virtual machine communicates with one or more additional virtual machines to establish membership for a virtual lock-step computing system, wherein each virtual machine is hosted by a node in a network. The virtual machine communicates with the one or more additional virtual machines to determine a membership configuration, wherein a first virtual machine in the membership configuration is an active machine, and all remaining virtual machines in the membership configuration are standby machines. A single step operation is executed by the virtual machine upon obtaining an operational token that includes contents of the single step operation, wherein the operational token is generated by the active machine. The operational token is passed to a next virtual machine in the membership configuration, wherein the operational token is passed between the virtual machine and the additional virtual machines according to the membership configuration.

25 Claims, 6 Drawing Sheets

FAULT TOLERANT VIRTUAL MACHINE

TECHNICAL FIELD

Embodiments of the present invention relate to virtual machines, and more specifically to virtual machines that achieve fault tolerance through lockstep computing.

BACKGROUND

Lockstep computing systems are computing systems that run the same set of operations in parallel or in series on multiple processors and/or machines. Each processor and/or machine receives and executes the operations (including inputs such as code, bus operations and asynchronous events) in a stepwise fashion to generate the same inputs from ports, outputs to ports, changes to register values and changes to memory. Therefore, if any of the processors or machines fail during execution of a process (e.g., an application, service or other sequence of instructions), the process continues uninterrupted by the remaining machines and/or processors.

Lockstep computing systems provide fault tolerance (any fault in the system can be recovered from). However, lockstep computing hardware is much more expensive than standard computing hardware. This cost increases as the number of redundant processors and machines are included in a lockstep computing system. Therefore, despite the significant advantages of lockstep computing systems, they are not generally used due to cost restraints.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for performing lockstep computing with virtual machines. In one embodiment, a virtual machine communicates with additional virtual machines to establish membership for a virtual lockstep computing system. The virtual machines communicate to determine a membership configuration. A first virtual machine in the membership configuration is an active machine and all remaining virtual machines in the membership configuration are standby machines. The active machine executes a single step operation and generates an operational token that includes contents of the single step operation. The operational token can be passed between the virtual machine and the additional virtual machines according to the membership configuration. For example, a first standby machine in the membership configuration can receive the operational token from the active machine and a last standby machine in the membership configuration can pass the operational token back to the active machine. Each standby machine that receives the operational token may execute the single step operation whose contents are included therein. When the operational token is passed back to the active machine, the active machine may execute a next single step operation and generate a new operational token for distribution among the standby machines in the membership configuration.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "communicating", "executing", "passing", "determining", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus.

Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1A:
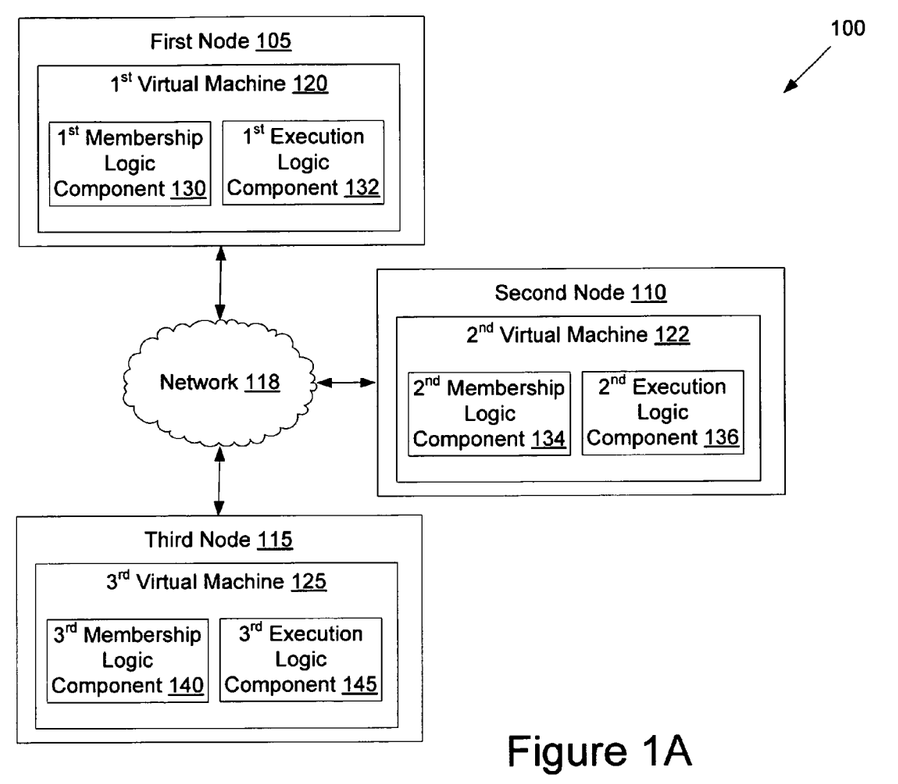
FIG. 1A illustrates an exemplary network architecture that includes multiple computing devices that can be combined to form a virtual lockstep computing system, in accordance with one embodiment of the present invention.

FIG. 1A illustrates an exemplary network architecture 100 that includes multiple computing devices that can be combined to form a virtual lockstep computing system, in accordance with one embodiment of the present invention. The network architecture 100 includes multiple nodes (e.g., first node 105, second node 110 and third node 115) connected via a network 118, which can be a public network (e.g., the internet) or a private network (e.g., a local area network (LAN), wide area network (LAN), etc.).

Each node 105, 110, 115 may be a personal computer (PC), palm-sized computing device, personal digital assistant (PDA), server, or other computing device. In one embodiment, each node 105, 110, 115 hosts a virtual machine. For example, first node 105 hosts first virtual machine 120, second node 110 hosts second virtual machine 122 and third node 115 hosts third virtual machine 125. Alternatively, a single node can host multiple virtual machines.

A virtual machine 120, 122, 125 is a software implementation of a machine (e.g., a computing device) that executes instructions like a real (hardware) machine. Virtual machines include system virtual machines that provide a complete system platform on which a complete operating system can run and process virtual machines that support a single process (e.g., a single program or application). For the first node 105, second node 110 and third node 115 to function as a virtual lockstep computing system, each of the first virtual machine 120, second virtual machine 122 and third virtual machine 125 may be instances of the same virtual machine. Each of the first virtual machine 120, second virtual machine 122 and third virtual machine 125 also may have the same system state.

In one embodiment, each of the virtual machines 120, 122, 125 includes a membership logic component (e.g., first membership logic component 130, second membership logic component 134 and third membership logic component 140) and an execution logic component (e.g., first execution logic component 132, second execution logic component 136 and third execution logic component 145). Membership logic components 130, 134, 140 can use a membership protocol to form a virtual lockstep computing system between the virtual machines 120, 122, 125. Execution logic components 132, 136, 145 can then obtain, execute and pass on single step operations according to an operation protocol.

In one embodiment, first virtual machine 120 is started on first node 105. First virtual machine 120 may be initialized by a user, or by an application (e.g., without user input). Upon startup of first virtual machine 120 (e.g., during the startup process or after startup), first virtual machine 120 sends an initialize message to second node 110 and third node 115 directing them to invoke second virtual machine 122 and third virtual machine 125, respectively. The initialize message may be broadcast to all nodes on network 118, or may be sent only to second node 110 and third node 115 (e.g., via unicast). In one embodiment, first membership logic component 130 sends the initialize message. Alternatively, the initialize message may be automatically sent by another logic component of first virtual machine 120 (e.g., by a script in a configuration file).

The initialize message may include a broadcast address to which virtual machines 122, 125 can respond to become members of the virtual lockstep computing system. Once initialized, the second virtual machine 122 and third virtual machine 125 may send a response to the broadcast address to identify themselves as potential members in the virtual lockstep computing system. The initialize message may also include a virtual lockstep identifier that uniquely identifies a virtual lockstep computing system associated with the initialize message. In one embodiment, the virtual lockstep identifier is defined by a combination of a process identifier of the first virtual machine 120 and a unique identifier of the first node 105 (e.g., an IP address, a unique node name identifier, etc.). All subsequent messages transmitted between the first node 105, second node 110 and third node 115 that are associated with the lockstep virtual machine can include the virtual lockstep identifier.

Once all potential members of the virtual lockstep computing system have been identified, the membership logic components 130, 134, 140 of the potential members implement a membership protocol to determine an actual membership for the virtual lockstep computing system. The membership protocol is used to build a network of fully connected nodes such that every node can communicate with each other node in the membership. An example of a membership protocol that may be used is the Totem Single-Ring Ordering and Membership Protocol. Other membership protocols may also be used.

In one embodiment, the membership logic components 130, 134, 140 use the membership protocol to determine a membership configuration. Each virtual machine 120, 122, 125 in the membership is assigned a distinct place in the membership configuration in a deterministic manner (no randomness is involved in determination of the membership configuration). The virtual machines may be sorted for placement in the membership configuration based on network addresses (e.g., ascending IP addresses), virtual machine process identifiers, or some other characteristic of the virtual machines. In one embodiment, the first virtual machine that was initialized is assigned as a first machine in the membership configuration (e.g., first virtual machine 120 in the above example). In another embodiment, one or more placements of virtual machines in the membership configuration are specified by a user. For example, a user may select a specific virtual machine as the first machine in the membership configuration. Alternatively, the first machine in the membership configuration may be the last virtual machine initialized, the virtual machine residing on the fastest node, the virtual machine with the lowest virtual machine process identifier, etc.

Figure 1B:
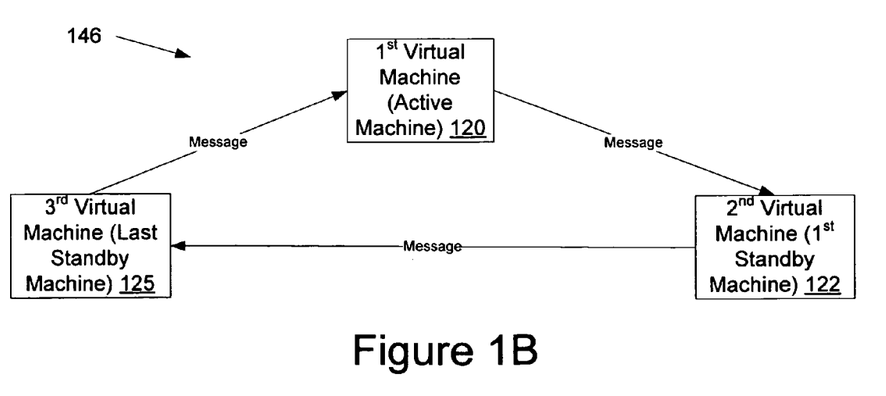
FIG. 1B illustrates a virtual lockstep computing system, in accordance with one embodiment of the present invention.

Each virtual machine 120, 122, 125 may be configured to pass messages to a next virtual machine in the membership configuration. If a virtual machine is the last machine in the membership configuration, the next virtual machine in the membership configuration can be the first virtual machine in the membership configuration. Therefore, the membership configuration may establish a ring of communication. Such a ring of communication is illustrated in FIG. 1B below.

Returning to FIG. 1A, the membership configuration identifies the first machine in the membership configuration as an active machine, and the remaining machines in the membership configuration as standby machines. The active machine can be the first machine to execute operations, and the machine receiving inputs (e.g., from a user, service or application).

Upon completion of the membership protocol, consensus as to the membership of the virtual lockstep computing system and as to the membership configuration is established. The membership logic components 130, 134, 140 then circulate a commit token in order according to the membership configuration such that the active machine passes the commit token to a first standby machine, and the last standby machine passes the commit token back to the active machine. By passing the commit token to a next virtual machine in the membership configuration, each virtual machine is committing to membership in the virtual lockstep computing system. Upon receiving the commit token (after it has circulated through each of the standby machines), the active machine can execute a first single step operation, thus beginning operation of the virtual lockstep computing system.

Once consensus of the membership and membership configuration for the virtual lockstep computing system is established, execution logic components 132, 136, 145 execute one or more applications and/or services in a step-wise fashion according to an operation protocol. According to the operation protocol, an execution logic component of the active machine (e.g., first execution logic component 132) executes a single step operation (e.g., a single operation of an application or service that includes a small finite number of instructions or a single instruction) and generates an operational token for that operation. Execution of an operation can cause changes in memory values, changes to registers, inputs from ports and outputs to ports. These changes, inputs and outputs are collectively referred to herein as the contents of a single step operation. Such contents of the single step operation are included in the operational token.

The operational token can be passed to the first standby machine in the membership configuration (e.g., the second virtual machine 122). The execution logic component 136 of this virtual machine can execute the operation, and pass the operational token on to the next machine in the membership configuration. In one embodiment, the execution logic component 136 of the recipient virtual machine passes on the operational token before executing the single step operation whose contents are included therein. In such an embodiment, the execution logic component can store the contents of the single step operation, and then execute them after passing on the operational token. This may provide optimal operating speed of the virtual lock step computing system. In another embodiment, the execution logic component 136 may start executing the contents of the single step operation, and then pass on the operational token before the execution is completed. In yet another embodiment, the execution logic component may wait until execution of the single step operation is complete before passing on the operational token.

The operational token may be passed among the members of the virtual lockstep computing system in order according to the membership configuration, with each machine executing the single step operation whose contents are included in the operational token. The last virtual machine in the membership configuration can pass the operational token back to the first machine in the membership configuration, which can then generate a new operational token for a next single step operation. This process may continue until the application(s) and/or service(s) being run by the virtual lockstep computing system terminate. Use of operational tokens enables lost messages to be automatically recovered simply by resending the operational token. This can provide substantial performance benefits over other messaging techniques.

FIG. 1B illustrates a virtual lockstep computing system 146, in accordance with one embodiment of the present invention. The lockstep computing system 146 includes a first virtual machine 120, a second virtual machine 122 and a third virtual machine 125. These virtual machines have implemented a membership protocol to establish the first virtual machine 120 as an active machine, the second virtual machine as a first standby machine, and the third virtual machine 125 as the last standby machine. First virtual machine 120 passes messages to second virtual machine 122, second virtual machine 122 passes messages to third virtual machine 125, and third virtual machine passes messages to first virtual machine 120. These messages may include commit tokens, operational tokens, or other messages. The ring of communication between the first virtual machine 120, second virtual machine 122 and third virtual machine 125 enables lockstep computing between virtual machines hosted by different nodes in a network with a minimum of overhead.

Figure 1C:
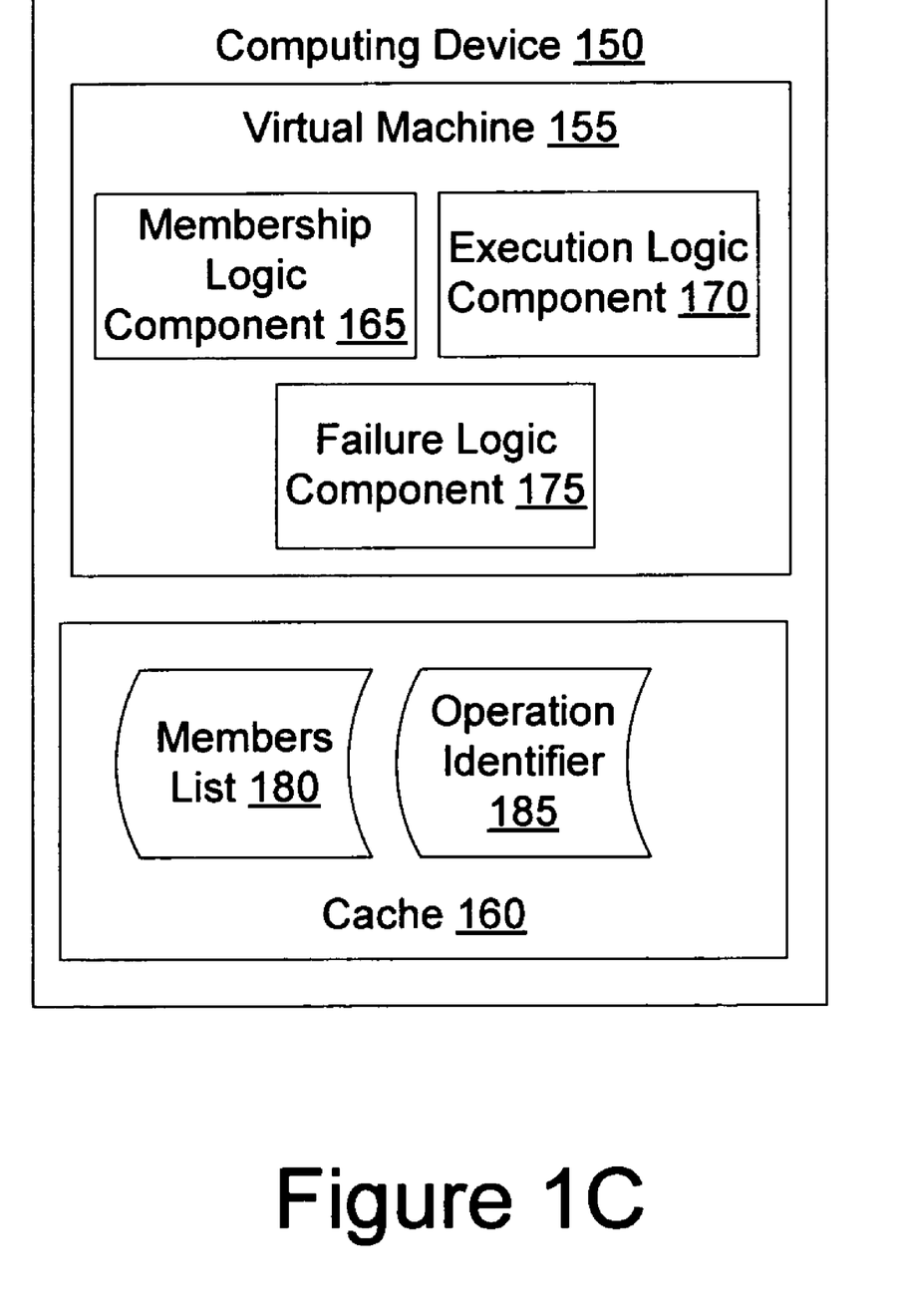
FIG. 1C illustrates a block diagram of a computing device, in accordance with one embodiment of the present invention.

FIG. 1C illustrates a block diagram of a computing device 150, in accordance with one embodiment of the present invention. Computing device 150 may act as a node in a virtual lockstep computing system. In one embodiment, computing device 150 corresponds to one or more of first node 105, second node 110 and third node 115 of FIG. 1A.

Referring to FIG. 1C, computing device 150 includes a virtual machine 155 and a cache 160. The virtual machine 155 may be a process virtual machine or a system virtual machine. The cache 160 can be a volatile memory (e.g., random access memory (RAM) or a nonvolatile memory (e.g., nonvolatile random access memory (NVRAM), Flash, etc.). The virtual machine 155 (or logic components of the virtual machine 155) can store values in cache 160 during operation.

In one embodiment, virtual machine 155 includes a membership logic component 165, an execution logic component 170 and a failure logic component 175. The membership logic component 165 can establish a membership and membership configuration of virtual machines in a virtual lockstep computing system, as discussed above with reference to FIG. 1A. The membership and membership configuration can be stored in cache 160 in a members list 180. Each virtual machine in a virtual lockstep computing system may include a copy of the same members list 180. The members list 180 may identify the placement of each virtual machine in the membership configuration, and may also include a network address (e.g., IP address or unique node name) of each virtual machine. Therefore, the members list can be used to determine where to send messages associated with operation of the virtual lockstep computing system (including determining what the next virtual machine in a membership configuration is, and the network address associated with that virtual machine).

Execution logic component 170 receives, executes and passes on single step operations associated with an application or service being run by the virtual lockstep computing system via operational tokens. Execution logic component 170 may maintain an operation identifier 185 in cache 160 that identifies previously executed single step operations. In one embodiment, the operation identifier 185 identifies the last single step operation that was executed by execution logic component 170. Alternatively, the operation identifier 185 may include a list of all single step operations executed by execution logic component 170, or a specified number of previously executed single step operations.

In one embodiment, each operational token includes a sequence identifier that uniquely identifies the single step operation whose contents are included in the operational token. In one embodiment, each new sequence identifier is greater than a sequence identifier of a previous operational token. In a further embodiment, the sequence identifier is incremented sequentially for each new operational token. For example, a first operational token may have a sequence ID of 1, a second operational token may have a sequence ID of 2 and a hundredth operational token may have a sequence ID of 100.

When the execution logic component 170 of the active machine executes a new single step operation, the execution logic component 170 can increment the operation identifier 185. The execution logic component 170 of the active machine can then generate a new operational token having a sequence identifier that is the same as the operation identifier 185 and send the operational token to the first standby machine in the membership configuration.

When the execution logic component 170 of a standby machine receives an operational token, it can compare the sequence identifier included in the operational token with an operation identifier 185 stored in cache 160. If the sequence identifier is greater than the operation identifier 185 (or alternatively if the sequence identifier does not match any entries in the operation identifier 185), then the execution logic component 170 may execute the single step operation whose contents are included in the operational token. The execution logic component 170 may then replace the value of the operation identifier 185 with the value of the sequence identifier (or alternatively add a new entry in the operation identifier 185 having a value of the sequence identifier). If the sequence identifier is not greater than the operation identifier (or if the sequence identifier matches an entry in the operation identifier), the execution logic component 170 may pass on the operational token to a next virtual machine in the membership configuration without executing the single step operation whose contents are included in the operational token. This can prevent a virtual machine 155 from executing the same single step operation more than once.

Failure logic component 175 can detect when a network or machine failure occurs in the virtual lockstep computing system. In one embodiment, failure logic component 175 maintains a resend timer. The resend timer can be reset each time an operational token is received or each time an operational token is passed on to a next virtual machine. If the resend timer times out before a new operational token (or other message associated with the virtual lockstep computing system) is received, then the operational token may be resent. The resend timer can therefore resend operational tokens that are lost in transit.

In another embodiment, failure logic component 175 maintains a fail timer. As with the resend timer, the fail timer can be reset each time an operational token is received, or each time an operational token is sent to another virtual machine. In one embodiment, the fail timer has a time limit that is greater than the resend timer. Therefore, an operational token may be resent at least once (and possibly multiple times) before the fail timer times out. If the fail timer times out, then it can be assumed that one of the virtual machines in the virtual computing system has failed.

When a virtual machine is detected to have failed (e.g., the fail timer has timed out), the membership protocol can be invoked to reestablish membership of the virtual lockstep computing system. To reestablish membership, one or more of the virtual machines that were members of the original membership can send queries to the other previous members. Virtual machines that receive these queries are notified that the sender of the query has not failed, and can send back a response to notify the sender that the recipient has not failed. Those virtual machines that do not send out such queries or respond to such queries can be assumed to have failed.

Once it is established which of the previous members are still functional, a new membership configuration can be established among the reestablished membership. In one embodiment, positions of the original membership configuration are maintained in the new membership configuration to the extent possible. For example, if the previously active machine is still functional, it remains the active machine. However, if the previously active machine failed, the first standby machine from the original membership configuration can become the new active machine, and all other standby machines can be moved up one position in the membership configuration (e.g., the second standby machine becomes the first standby machine, etc.). In another embodiment, the previous membership configuration is not considered in determining the new membership configuration. For example, a virtual machine that had been the last standby machine could become the new active machine, and the virtual machine that had previously been the active machine could become the first standby machine. Establishing the new membership configuration may include storing a new members list 180 in caches 160 of each of the virtual machines that make up the reestablished membership.

In one embodiment, new virtual machines that were not included in the original membership can be included in the reestablished membership. This may be desirable, for example, if only a limited number of virtual machines that belonged to the original membership are still functional. To include a new virtual machine in the reestablished membership, a state of the new virtual machine should be synchronized to states of the existing virtual machines. State synchronization can be achieved by replicating a virtual machine that was included in the original membership, and copying the replicated virtual machine to a new node. When the new membership configuration is established, the new virtual machine may be added as a last standby node in the membership configuration. Alternatively, the new virtual machine may be placed elsewhere in the membership configuration (e.g., if the new membership configuration is not based on the original membership configuration).

After the new membership configuration is established, a new commit token may be generated by the new active machine and passed between the virtual machines in order according to the membership configuration. Once the new commit token is returned to the new active machine, the virtual lockstep computing system may continue operating where it left off before a failure was detected. In one embodiment, an operational token is generated for the last single step operation that was executed by the new active machine before the failure was detected. This operational token can include a sequence identifier that matches a sequence identifier of an operational token that had previously been generated (before failure) for the same single step operation. In a further embodiment, the operational token includes a recovery flag that identifies that this message has been generated and transmitted after recovery from failure of one or more virtual machines. The operational token can be passed in order among the virtual machines according to the membership configuration, and those virtual machines that did not previously execute the single step operation whose contents are included in the operational token can now execute the operation. When the operational token is returned to the active machine, it can execute a next operation and generate a new operational token. Thus the virtual lockstep computing system can continue processing without missing a single operation even when multiple machines fail.

Figure 2:
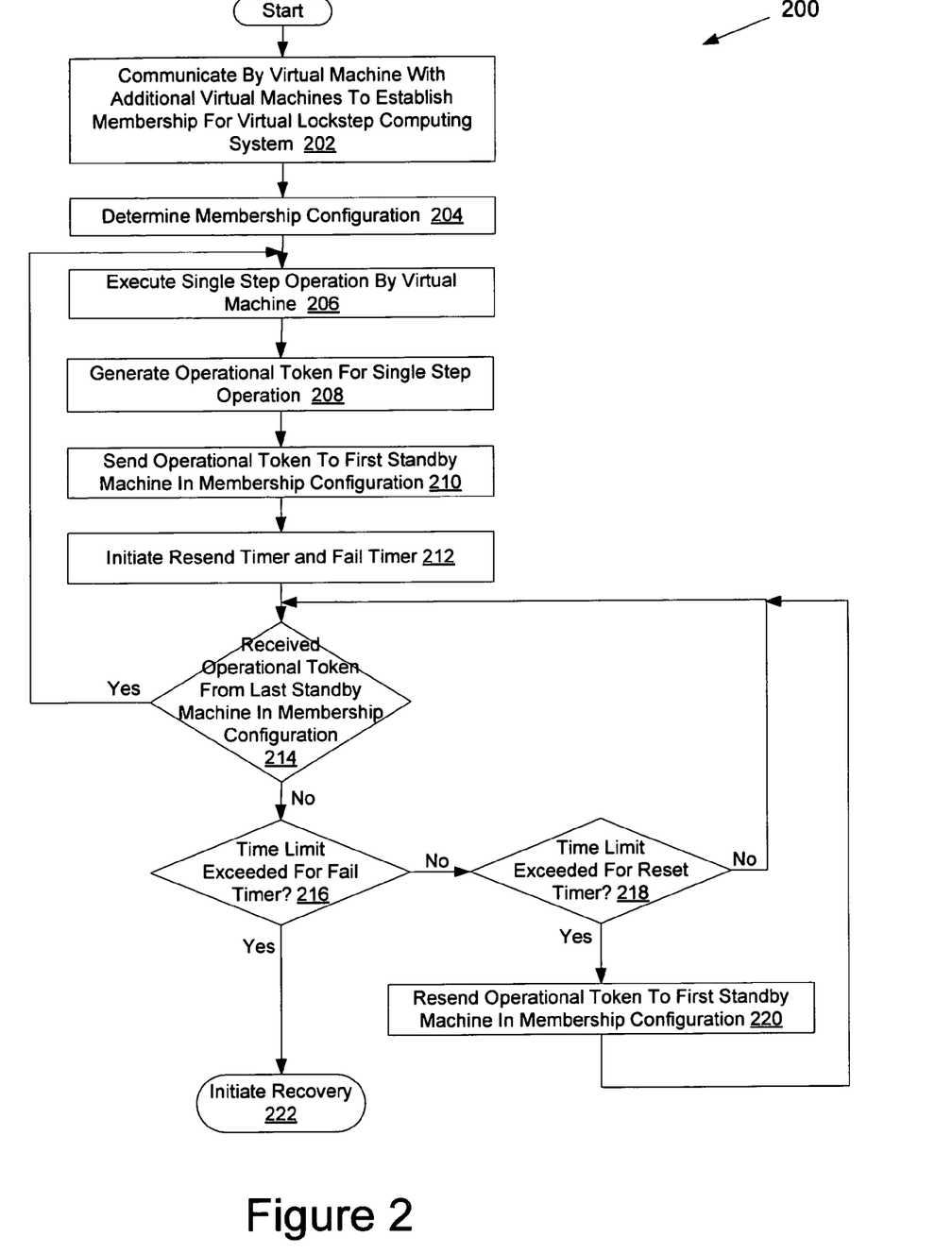
FIG. 2 illustrates a flow diagram of one embodiment for a method of implementing a virtual lockstep computing system.

FIG. 2 illustrates a flow diagram of one embodiment for a method 200 of implementing a virtual lockstep computing system. The method is performed by processing logic that comprises hardware (e.g., circuitry, dedicated logic, programmable logic, microcode, etc.), software (such as instructions run on a processing device), or a combination thereof. In one embodiment, method 200 is performed by a virtual machine (e.g., first virtual machine 120 of FIG. 1A) that operates in combination with other virtual machines (e.g., second virtual machine 122 and third virtual machine 125 of FIG. 1A). Each such virtual machine may be hosted by a node in a network (e.g., first node 105, second node 110 and third node 115 of FIG. 1A).

Referring to FIG. 2, method 200 includes communicating by a virtual machine with additional virtual machines to establish membership for a virtual lockstep computing system (block 202). The virtual machine may be initialized on a first node by a user. Alternatively, the virtual machine may be initialized upon receiving an initialize message from another virtual machine. The virtual machine may then transmit a message to one or more nodes (e.g., using unicast or broadcast) that are networked to the first node requesting participation in the virtual lockstep computing system. Some or all of the nodes may initialize additional virtual machines, which can then respond to the participation request.

At block 204, the virtual machine communicates with the additional virtual machines to determine a membership configuration among the virtual machines in the established membership. The membership configuration may be determined based on characteristics of the member virtual machines. For example, membership configuration may be determined based upon network address, order of initialization, process identification, or some other criteria. In one embodiment, the virtual machine is designated as an active machine and the additional virtual machines are designated as standby machines. Once membership and membership configuration have been determined, a commit token may be passed among the virtual machines in order according to the membership configuration to ensure that all such virtual machines are committed to the virtual lockstep computing system. In one embodiment, membership and membership configuration of virtual machines within the virtual lockstep computing system can be established using a membership protocol (e.g., the Totem Single-Ring Ordering and Membership Protocol).

At block 206, the virtual machine executes a single step operation. At block 208, the virtual machine generates an operational token for the single step operation. Contents of the single step operation, including any memory address changes, changes to registers, inputs from ports and/or outputs to ports are included in the operational token. The operational token may also include a sequence identifier that uniquely identifies the single step operation, a virtual lockstep processing system identifier that uniquely identifies the virtual lockstep processing system that the operational token is associated with and/or additional information. In an alternative embodiment, the virtual machine may generate the operational token and pass it on to the next machine in the membership configuration prior to executing the single step operation, or in parallel to executing the single step operation.

At block 210, the virtual machine sends the operational token to a first standby machine in the membership configuration. The first standby machine can then execute the single step operation whose contents are included in the operational token. The operational token can be passed between the virtual machine and the additional virtual machines according to the membership configuration, and each virtual machine receiving the operational token can execute the single step operation.

At block 212, the virtual machine initiates a resend timer and a fail timer. The resend timer can be used to detect lost messages, and the fail timer can be used to detect failed virtual machines. Alternatively, the resend timer and fail timer may be started before the virtual machine executes the single step operation (block 206), or before or after the operational token is generated (block 208).

At block 214, processing logic determines whether the virtual machine has received the operational token from a last standby machine in the membership configuration. If the virtual machine has received the operational token, then the method returns to block 206 and a next single step operation is executed. If the virtual machine has not received the operational token, the method proceeds to block 216.

At block 216, processing logic determines whether a time limit has been exceeded for the fail timer (e.g., if the fail timer has timed out). If a time limit has been exceeded for the fail timer, it can be assumed that a virtual machine has failed, and the method proceeds to block 222. Otherwise, the method proceeds to block 218. At block 218, processing logic determines whether a time limit has been exceeded for the resend timer (e.g., if the resend timer has timed out). If the resend timer has not timed out, the method returns to block 214. If the resend timer has timed out, then it can be assumed that the operational token was lost in transmission, and the method proceeds to block 220. At block 220, the virtual machine resends the operational token to the first standby machine in the membership configuration, and the resend timer is reset. The method then returns to block 214.

At block 222, recovery is initiated. One embodiment of a method for performing recovery is described with reference to FIG. 4 below.

Figure 3:
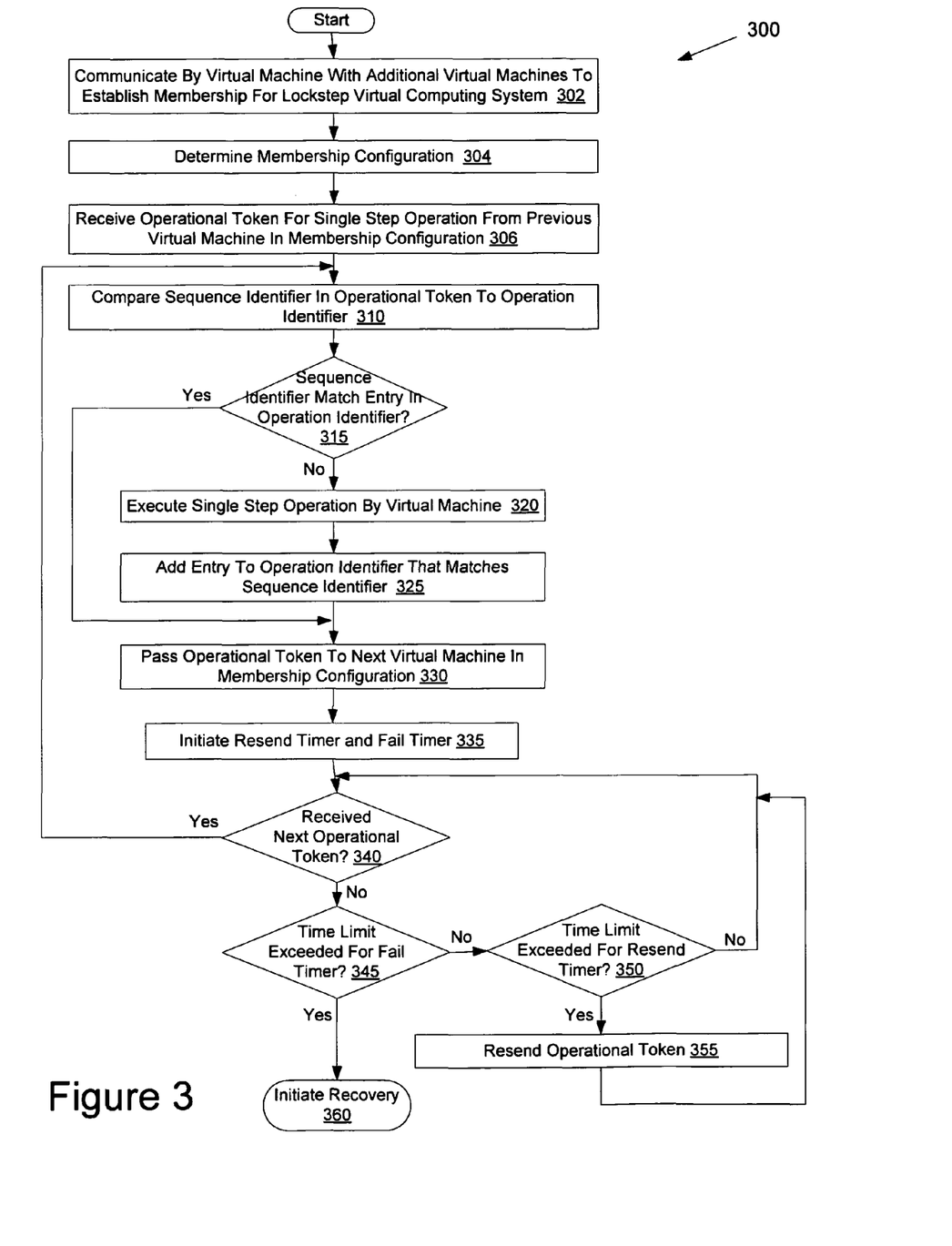
FIG. 3 illustrates a flow diagram of another embodiment for a method of implementing a virtual lockstep computing system.

FIG. 3 illustrates a flow diagram of another embodiment for a method 300 of implementing a virtual lockstep computing system. The method is performed by processing logic that comprises hardware (e.g., circuitry, dedicated logic, programmable logic, microcode, etc.), software (such as instructions run on a processing device), or a combination thereof. In one embodiment, method 300 is performed by a virtual machine (e.g., second virtual machine 122 of FIG. 1A) that operates in combination with other virtual machines (e.g., first virtual machine 120 and third virtual machine 125 of FIG. 1A). Each such virtual machine may be hosted by a node in a network (e.g., first node 105, second node 110 and third node 115 of FIG. 1A).

Referring to FIG. 3, method 300 includes communicating by a virtual machine with additional virtual machines to establish membership for a virtual lockstep computing system (block 302). The virtual machine may be initialized on a first node by a user. Alternatively, the virtual machine may be initialized upon receiving an initialize message from another virtual machine. The virtual machine may then transmit a message back to the virtual machine that caused it to be initialized responding to the participation request. The virtual machine may also transmit a message to one or more nodes (e.g., using unicast or broadcast) requesting participation in the virtual lockstep computing system. Some or all of the nodes may initialize additional virtual machines, which can then respond to the participation request.

At block 304, the virtual machine communicates with the additional virtual machines to determine a membership configuration among the virtual machines in the established membership. The membership configuration may be determined based on characteristics of the member virtual machines. For example, membership configuration may be determined based upon network address, order of initialization, process identification, or some other criteria. In one embodiment, the virtual machine is designated as a standby machine in the virtual lockstep computing system. Once membership and membership configuration have been determined, a commit token may be passed among the virtual machines in order according to the membership configuration to ensure that all such virtual machines are committed to the virtual lockstep computing system. In one embodiment, membership and membership configuration of virtual machines within the virtual lockstep computing system can be established using a membership protocol (e.g., the Totem Single-Ring Ordering and Membership Protocol).

At block 306, the virtual machine receives an operational token for a single step operation from a previous virtual machine in the membership configuration. Contents of the single step operation, including any memory address changes, changes to registers, inputs from ports and/or outputs to ports are included in the operational token. The operational token may also include a sequence identifier that uniquely identifies the single step operation, a virtual lockstep identifier that uniquely identifies the virtual lockstep processing system that the operational token is associated with and/or additional information.

At block 310, the virtual machine compares the sequence identifier included in the operational token to an operation identifier that may be maintained in a cache by the virtual machine. The operation identifier can indicate one or more previous single step operations that were executed by the virtual machine.

At block 315, if the sequence identifier does not match an entry in the operation identifier (e.g., if the sequence identifier has a value that is greater than an entry in the operation identifier), then the virtual machine has not previously executed the single step operation associated with the operational token. In such a circumstance, the method proceeds to block 320. If the sequence identifier does match an entry in the operational identifier, then the virtual machine has previously executed the single step operation associated with the operational token, and the method proceeds to block 330.

At block 320, the virtual machine executes the single step operation whose contents are included in the operational token. At block 325, the virtual machine adds an entry to the operation identifier that matches the sequence identifier. This may include replacing an entry in the operation identifier (e.g., if it maintains only a single entry) or adding a new entry to the operation identifier (e.g., if multiple entries are maintained).

At block 330, the operational token is passed to a next virtual machine in the membership configuration. The operational token can be passed between the virtual machine and the additional virtual machines according to the membership configuration, and each virtual machine receiving the operational token can execute the single step operation. In an alternative embodiment, the operational token may be passed on to the next virtual machine in the membership configuration before executing the single step operation whose contents are included therein, or the operational token may be passed on in parallel to executing the single step operation. Moreover, the operational token may be copied and passed on before comparing the sequence identifier to the operation identifier.

At block 335, a resend timer and a fail timer are initiated (or reset). The resend timer can be used to detect lost messages, and the fail timer can be used to detect failed virtual machines. Alternatively, the resend timer and fail timer may be started before the virtual machine executes the single step operation (block 320), or after the virtual machine receives the operational token (block 306).

At block 340, processing logic determines whether the virtual machine has received a next operational token (or some other message associated with the virtual lockstep computing system) from the previous virtual machine in the membership configuration. If the virtual machine has received the next operational token (or other message), then the method returns to block 310. If the virtual machine has not received the operational token, the method proceeds to block 345.

At block 345, processing logic determines whether a time limit has been exceeded for the fail timer (e.g., if the fail timer has timed out). If a time limit has been exceeded for the fail timer, the method proceeds to block 360. Otherwise, the method proceeds to block 350. At block 350, processing logic determines whether a time limit has been exceeded for the resend timer (e.g., if the resend timer has timed out). If the resend timer has not timed out, the method returns to block 340. If the resend timer has timed out, the method proceeds to block 335. At block 335, the virtual machine resends the operational token to the next virtual machine in the membership configuration and resets the resend timer. The method then returns to block 340.

At block 360, recovery is initiated. One embodiment of a method for performing recovery is described with reference to FIG. 4 below.

Figure 4:
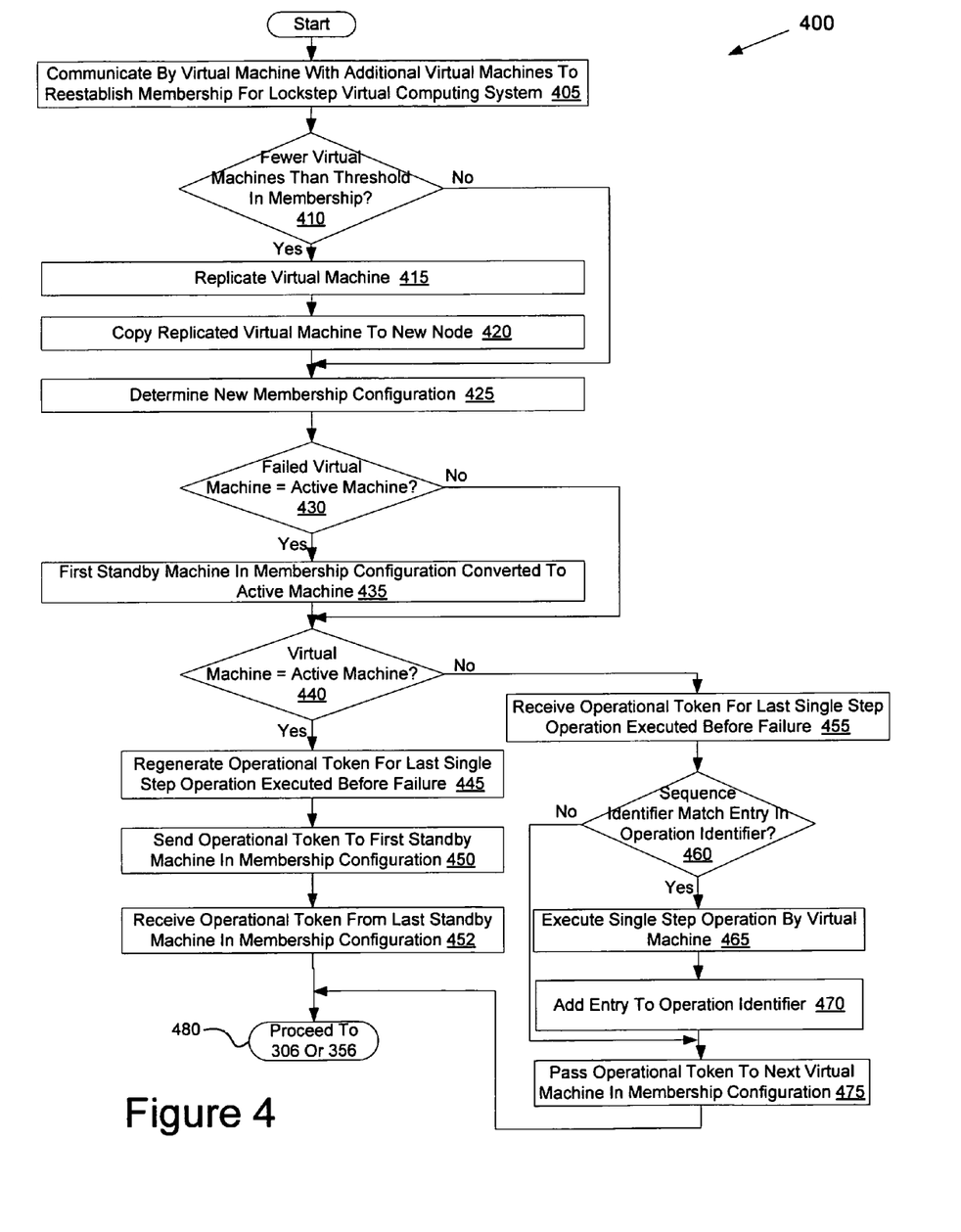
FIG. 4 illustrates a flow diagram of one embodiment for a method of recovering from a failure of a virtual machine in a virtual lockstep computing system.

FIG. 4 illustrates a flow diagram of one embodiment for a method 400 of recovering from a failure of a virtual machine in a virtual lockstep computing system. The method is performed by processing logic that comprises hardware (e.g., circuitry, dedicated logic, programmable logic, microcode, etc.), software (such as instructions run on a processing device), or a combination thereof. In one embodiment, method 400 is performed by a virtual machine (e.g., first virtual machine 120 or second virtual machine 122 of FIG. 1A) that operates in combination with other virtual machines (e.g., first virtual machine 120, second virtual machine 122 and third virtual machine 125 of FIG. 1A). Each such virtual machine may be hosted by a node in a network (e.g., first node 105, second node 110 and third node 115 of FIG. 1A). Method 400 can be initiated by one or more virtual machines that are members of a virtual lockstep computing system upon detecting a failed virtual machine.

Referring to FIG. 4, method 400 includes communicating by a virtual machine with additional virtual machines to reestablish membership for a virtual lockstep computing system (block 405). The virtual machine may transmit a message to one or more nodes (e.g., using unicast or broadcast) that host virtual machines that had been members of a virtual lockstep computing system requesting continued participation in the virtual lockstep computing system. The virtual machine may also transmit messages to nodes that had not hosted virtual machines that were members of the virtual lockstep computing system.

At block 410, processing logic determines whether there are fewer virtual machines than a threshold number of virtual machines that will make up the reestablished membership.

The threshold may be two machines, three machines, ten machines, or some other value. If there are fewer virtual machines than the threshold value, then the method proceeds to block 415. If there are not fewer virtual machines than the threshold value, the method proceeds to block 425.

At block 415, the virtual machine is replicated. A block 420, the replicated virtual machine is copied to a new node. This causes a state of a new virtual machine to become synchronized with states of existing virtual machines.

At block 425, a new membership configuration is determined. In one embodiment, new virtual machines are designated as last virtual machines in the membership configuration. In one embodiment, a virtual machine that had been the active machine in the original membership configuration is designated as the active machine in the new membership configuration if possible. Alternatively, the new membership configuration may be established without consideration towards the original membership configuration.

At block 430, processing logic determines whether the virtual machine that had previously been the active machine has failed. If the previous active machine has failed, the method proceeds to block 435 and the first standby machine in the new membership configuration is converted to the new active machine. If the previous active machine has not failed, the method proceeds to block 440.

At block 440, processing logic determines whether the current virtual machine (e.g., the machine performing method 400) is the active machine. If the current virtual machine is the active machine, the method proceeds to block 445. If the current virtual machine is not the active machine, the method proceeds to block 455.

At block 445, the virtual machine regenerates an operational token for the last single step operation that was executed before the failure was detected. Contents of the single step operation, including any memory address changes, changes to registers, inputs from ports and/or outputs to ports are included in the operational token. The operational token may also include a sequence identifier that uniquely identifies the single step operation, a virtual lockstep processing system identifier that uniquely identifies the virtual lockstep processing system that the operational token is associated with and/or additional information. In one embodiment, the operational token further includes a recovery flag that alerts recipients that the single step operation includes in the operational token was the last operation to be executed by at least some of the virtual machines before the failure.

At block 450, the virtual machine sends the operational token to a first standby machine in the membership configuration. The first standby machine can then execute the single step operation whose contents are included in the operational token if that virtual machine had not executed the single step operation before the failure. The operational token can be passed between the virtual machine and the additional virtual machines according to the membership configuration, and each virtual machine receiving the operational token can execute the single step operation if it had not previously done so. At block 452, the virtual machine receives the operational token from the last standby machine in the membership configuration. The method then proceeds to block 480.

At block 455, the virtual machine receives an operational token for the last single step operation that was executed by the active machine before the failure. The operational token may be received from a previous virtual machine in the membership configuration. Contents of the single step operation, including any memory address changes, changes to registers, inputs from ports and/or outputs to ports are included in the operational token. The operational token may also include a sequence identifier that uniquely identifies the single step operation, a virtual lockstep identifier that uniquely identifies the virtual lockstep processing system that the operational token is associated with and/or additional information. In one embodiment, the operational token further includes a recovery flag that alerts the virtual machine that the single step operation included in the operational token was the last operation to be executed by at least some of the virtual machines before the failure.

At block 460, the virtual machine compares the sequence identifier included in the operational token to an operation identifier that may be maintained in a cache by the virtual machine. The operation identifier indicates one or more previous single step operations that were executed by the virtual machine. If the sequence identifier does not match an entry in the operation identifier (e.g., if the sequence identifier has a value that is greater than an entry in the operation identifier), then the virtual machine has not previously executed the single step operation associated with the operational token. In such a circumstance, the method proceeds to block 465. If the sequence identifier does match an entry in the operational identifier, then the virtual machine has previously executed the single step operation associated with the operational token, and the method proceeds to block 475.

At block 465, the virtual machine executes the single step operation whose contents are included in the operational token. At block 470, the virtual machine adds an entry to the operation identifier that matches the sequence identifier. This may include replacing an entry in the operation identifier (e.g., if it maintains only a single entity) or adding a new entry to the operation identifier (e.g., if multiple entries are maintained).

At block 475, the operational token is passed to a next virtual machine in the membership configuration. The operational token can be passed between the virtual machine and the additional virtual machines according to the membership configuration, and each virtual machine receiving the operational token can execute the single step operation if they had not previously done so. The method then proceeds to block 480.

At block 480, the method terminates, and initiates block 206 of method 200 as shown in FIG. 2 or initiates block 306 of method 300 as shown in FIG. 3. Method 200 can be initiated if the current virtual machine is the active machine, and method 300 can be initiated if the current virtual machine is a standby machine.

Figure 5:
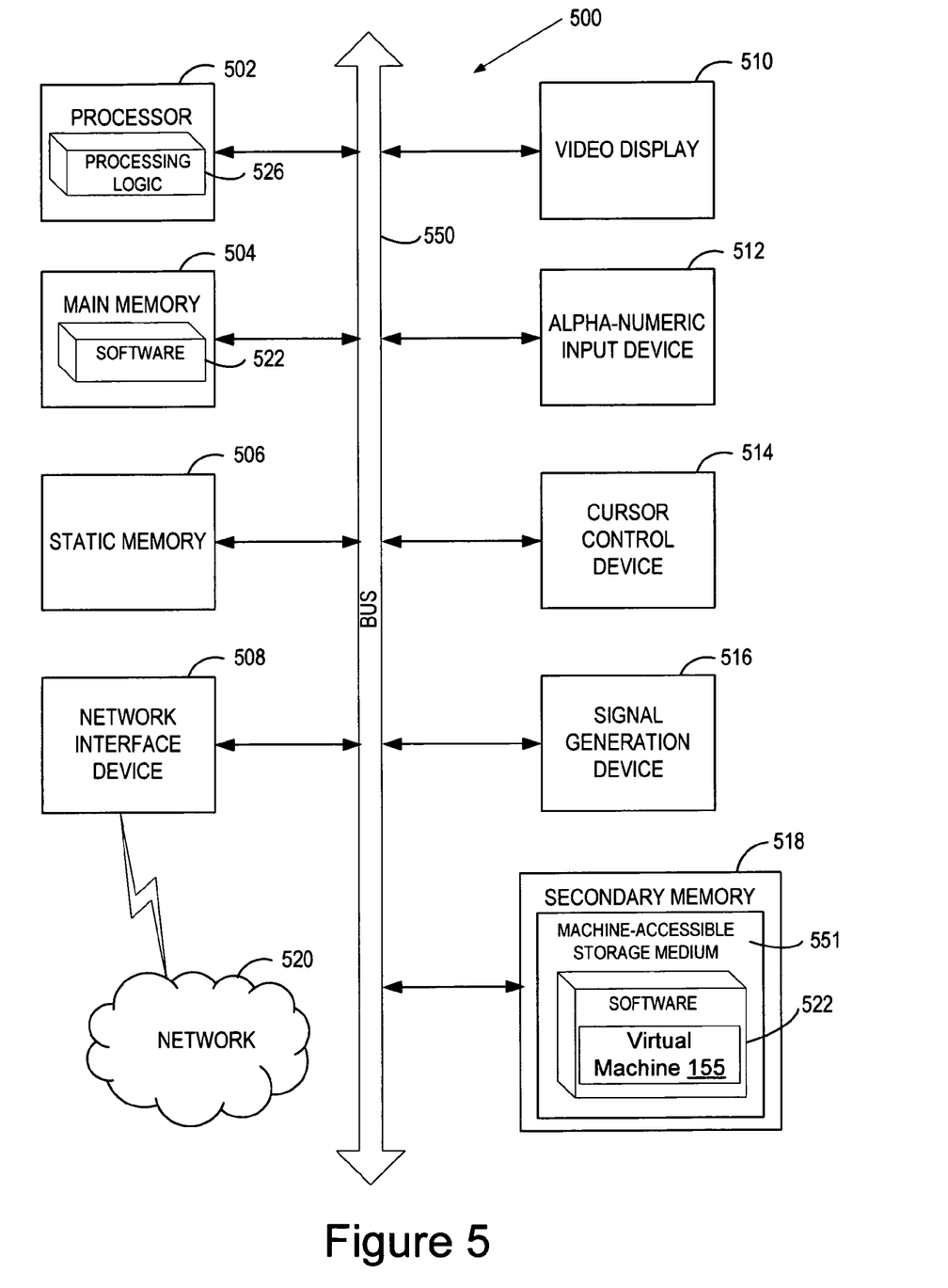
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store a virtual machine (e.g., virtual machine 155 of FIG. 1C), and/or a software library containing methods that call a virtual machine. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computerized method for performing lockstep computing with virtual machines, the method comprising:

communicating by a virtual machine with one or more additional virtual machines to establish membership for a virtual lockstep computing system, wherein each virtual machine is hosted by a node in a network, and wherein each virtual machine in the virtual lockstep computing system is to execute the same sequence of operations;

communicating by the virtual machine with the one or more additional virtual machines to determine a membership configuration for the virtual lockstep computing system, wherein a first virtual machine in the membership configuration is an active machine, and all remaining virtual machines in the membership configuration are standby machines;

executing a single step operation by the virtual machine upon obtaining an operational token that includes contents of the single step operation, wherein the operational token is generated by the active machine and said execution is based upon the contents in said operational token; and passing the operational token to a next virtual machine in the membership configuration, wherein the operational token is passed between the virtual machine and the additional virtual machines according to the membership configuration.

2. The method of claim 1, further comprising:

detecting a failure of at least one of the one or more additional virtual machines by the virtual machine;

communicating by the virtual machine with the one or more additional virtual machines to reestablish the membership for the virtual lockstep computing system, wherein the reestablished membership excludes all failed virtual machines;

obtaining a last operational token that includes contents of a last single step operation;

executing the last single step operation if the last single step operation was not executed by the virtual machine prior to detecting the failure; and passing the last operational token to the next virtual machine in the membership configuration.

3. The method of claim 2, further comprising:

if the virtual machine was the first standby machine in the membership configuration and a failed machine was the active machine, becoming a new active machine.

4. The method of claim 2, further comprising:

initiating a timer on the virtual machine; and detecting the failure if a specified time limit elapses on the timer.

5. The method of claim 2, wherein the reestablished membership includes virtual machines that were not in the original membership, the method further comprising:

replicating the virtual machine;

copying the replicated virtual machine to a new node in the network; and determining a new membership configuration for the reestablished membership.

6. The method of claim 1, wherein the virtual machine is the active machine, the method further comprising:
generating the operational token;
passing the operational token to a next virtual machine in the membership configuration;
receiving the operational token from the last standby machine in the membership configuration; and
generating a new operational token that includes contents of a next single step operation.

7. The method of claim 1, wherein the contents of the operation include changes in memory values, changes to registers, inputs from ports and outputs to ports.

8. The method of claim 1, wherein the operational token includes a new sequence identifier that has a value that is different than a previous sequence identifier included in a previous operational token, the method further comprising:
upon obtaining the operational token, comparing the new sequence identifier to an operation identifier maintained by the virtual machine;
if the sequence identifier matches an entry in the operation identifier, executing the single step operation whose contents are included in the operational token and adding an entry to the operation identifier that matches the new sequence identifier; and
if the sequence identifier does not match an entry in the operation identifier, passing the operational token to the next virtual machine in the membership configuration without executing the single step operation.

9. The method of claim 1, wherein establishing the membership includes generating a sorted members list that includes a network address of each virtual machine in the membership, wherein the membership configuration is at least partially dependent upon the members list.

10. A computing apparatus comprising:
a virtual machine to that operates in lockstep with one or more additional virtual machines that run on additional computing apparatuses, the virtual machine comprising:
a membership logic component to:
determine the one or more additional virtual machines that execute the same sequence of operations as the virtual machine, and with which the virtual machine operates in lock step, and to determine a membership configuration, wherein a first virtual machine in the membership configuration is an active machine and all remaining virtual machines in the membership configuration are standby machines; and
an execution logic component to execute a single step operation upon obtaining an operational token that includes contents of the single step operation and said execution is based upon the contents in said operational token, and to pass the operational token to a next virtual machine in the membership configuration, wherein the operational token is passed between the virtual machine and the additional virtual machines according to the membership configuration.

11. The computing apparatus of claim 10, the virtual machine further comprising:
a failure logic component to detect a failure of at least one of the one or more additional virtual machines;
the membership logic component to communicate with the one or more additional virtual machines to reestablish the membership for the virtual lockstep computing system, wherein the reestablished membership excludes all failed virtual machines;
the execution logic component to obtain a last operational token that includes contents of a last single step operation, to execute the last single step operation if the last single step operation was not executed by the virtual machine prior to detecting the failure, and to pass the last operational token to the next virtual machine in the membership configuration.

12. The computing apparatus of claim 11, wherein the virtual machine is configured to become a new active machine if the virtual machine was the first standby machine in the membership configuration and a failed machine was the active machine.

13. The computing apparatus of claim 11, wherein the failure logic component is configured to detect the failure if a specified time limit elapses on a timer.

14. The computing apparatus of claim 11, wherein the reestablished membership includes virtual machines that were not in the original membership, the virtual machine further comprising:
a replicator to replicate the virtual machine and to copy the replicated virtual machine to a new node in the network;
the membership logic component to determine a new membership configuration for the reestablished membership.

15. The computing apparatus of claim 10, wherein the virtual machine is the active machine, the virtual machine further comprising:
the execution logic component to generate the operational token, to pass the operational token to a next virtual machine in the membership configuration, to receive the operational token from the last standby machine in the membership configuration, and to generate a new operational token that includes contents of a next single step operation.

16. A computer readable storage medium including instructions that, when executed by a processing system, cause the processing system to perform a method for lockstep computing with virtual machines, the method comprising:
communicating by a virtual machine with one or more additional virtual machines to establish membership for a virtual lockstep computing system, wherein each virtual machine is hosted by a node in a network, and wherein each virtual machine in the virtual lockstep computing system is to execute the same sequence of operations;
communicating by the virtual machine with the one or more additional virtual machines to determine a membership configuration, wherein a first virtual machine in the membership configuration is an active machine, and all remaining virtual machines in the membership configuration are standby machines;
executing a single step operation by the virtual machine upon obtaining an operational token that includes contents of the single step operation, wherein the operational token is generated by the active machine and said execution is based upon the contents in said operational token;
and passing the operational token to a next virtual machine in the membership configuration, wherein the operational token is passed between the virtual machine and the additional virtual machines according to the membership configuration.

17. The computer readable storage medium of claim 16, the method further comprising:
detecting a failure of at least one of the one or more additional virtual machines by the virtual machine;
communicating by the virtual machine with the one or more additional virtual machines to reestablish the membership for the virtual lockstep computing system, wherein the reestablished membership excludes all failed virtual machines;

obtaining a last operational token that includes contents of a last single step operation;

executing the last single step operation if the last single step operation was not executed by the virtual machine prior to detecting the failure; and passing the last operational token to the next virtual machine in the membership configuration.

18. The computer readable storage medium of claim 17, the method further comprising:

if the virtual machine was the first standby machine in the membership configuration and a failed machine was the active machine, becoming a new active machine.

19. The computer readable storage medium of claim 17, the method further comprising:

initiating a timer on the virtual machine; and detecting the failure if a specified time limit elapses on the timer.

20. The computer readable storage medium of claim 17, wherein the reestablished membership includes virtual machines that were not in the original membership, the method further comprising:

replicating the virtual machine;

copying the replicated virtual machine to a new node in the network; and determining a new membership configuration for the reestablished membership.

21. The computer readable storage medium of claim 16, wherein the virtual machine is the active machine, the method further comprising:

generating the operational token;

passing the operational token to a next virtual machine in the membership configuration;

receiving the operational token from the last standby machine in the membership configuration; and generating a new operational token that includes contents of a next single step operation.

22. The computer readable storage medium of claim 16, wherein the operational token includes a new sequence identifier that has a value that is different than a previous sequence identifier included in a previous operational token, the method further comprising:

upon obtaining the operational token, comparing the new sequence identifier to an operation identifier maintained by the virtual machine;

if the sequence identifier matches an entry in the operation identifier, executing the single step operation whose contents are included in the operational token and adding an entry to the operation identifier that matches the new sequence identifier; and if the sequence identifier does not mach an entry in the operation identifier, passing the operational token to the next virtual machine in the membership configuration without executing the single step operation.

23. A computerized method for performing lockstep computing with virtual machines, the method comprising:

establishing membership for a virtual lockstep computing system from a plurality of nodes in a network, wherein the membership includes a plurality of virtual machines, each of which is hosted by one of the plurality of nodes, and wherein each virtual machine in the virtual lockstep computing system is to execute the same sequence of operations;

determining a membership configuration for the plurality of virtual machines, wherein a first virtual machine in the membership configuration is an active machine, and all remaining virtual machines in the membership configuration are standby machines; and executing single step operations by each of the plurality of virtual machines in strict order according to the membership configuration, wherein the active machine executes each single step operation based upon the contents in an operational token first, and a last standby machine in the membership configuration executes each single step operation last based upon the contents in said operational token.

24. The method of claim 23, further comprising:

initiating a timer on each of the plurality of virtual machines;

detecting a failure of one or more of the plurality of virtual machines if a time limit elapses on the timer;

reestablishing the membership for the virtual lockstep computing system, wherein the reestablished membership excludes the failed one or more of the plurality of virtual machines;

setting a first standby machine in the membership configuration as a new active machine if the failed one or more of the plurality of virtual machines was the active machine; and executing a last single step operation by those of the plurality of virtual machines in the reestablished membership that were unable to execute the last single step operation before the failure was detected.

25. The method of claim 23, further comprising:

after executing each single step operation by the active machine, generating an operational token that includes the contents of the single step operation; and passing the operational token in strict order among the plurality of virtual machines such that each of the plurality of virtual machines passes the operational token to a next virtual machine in the membership configuration and the last standby machine passes the operational token to the active machine, wherein each of the standby machines executes the single step operation upon first receiving the operational token.

* * * * *